(12) United States Patent
Nakayasu

(10) Patent No.: US 11,767,003 B2
(45) Date of Patent: Sep. 26, 2023

(54) BY-WIRE BRAKE SYSTEM FOR MOTOR VEHICLES

(71) Applicant: Continental Automotive Systems, Inc., Auburn Hills, MI (US)

(72) Inventor: Yuji Nakayasu, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 340 days.

(21) Appl. No.: 17/247,505

(22) Filed: Dec. 14, 2020

(65) Prior Publication Data

US 2022/0185254 A1    Jun. 16, 2022

(51) Int. Cl.
| | |
|---|---|
| *B60T 13/74* | (2006.01) |
| *B60T 13/66* | (2006.01) |
| *B60T 13/68* | (2006.01) |
| *B60T 13/14* | (2006.01) |
| *B60T 7/04* | (2006.01) |
| *B60T 17/22* | (2006.01) |
| *B60T 13/62* | (2006.01) |

(52) U.S. Cl.
CPC .......... *B60T 13/662* (2013.01); *B60T 7/042* (2013.01); *B60T 13/142* (2013.01); *B60T 13/62* (2013.01); *B60T 13/686* (2013.01); *B60T 13/745* (2013.01); *B60T 17/221* (2013.01); *B60T 2270/402* (2013.01); *B60T 2270/404* (2013.01); *B60T 2270/82* (2013.01)

(58) Field of Classification Search
CPC .... B60T 13/745; B60T 13/686; B60T 17/225; B60T 2270/102; B60T 2270/403; B60T 2270/404; B60T 2270/82; B60T 7/042; B60T 13/142; B60T 13/62; B60T 17/221
See application file for complete search history.

(56) References Cited

U.S. PATENT DOCUMENTS

| | | | |
|---|---|---|---|
| 5,281,012 A | 1/1994 | Binder et al. | |
| 6,234,588 B1 | 5/2001 | Sawada | |
| 6,450,591 B1 * | 9/2002 | Kawahata | B60T 8/3655 303/122.05 |
| 8,672,808 B2 | 3/2014 | Nishino et al. | |
| 9,145,121 B2 | 9/2015 | Jungbecker et al. | |
| 9,346,443 B2 | 5/2016 | Koo | |
| 2006/0066146 A1 * | 3/2006 | Otomo | B60T 13/147 303/151 |

(Continued)

FOREIGN PATENT DOCUMENTS

| | | | | |
|---|---|---|---|---|
| DE | 102013217954 A1 * | 3/2015 | ............ | B60T 8/4081 |
| WO | 2018130393 A1 | 7/2018 | | |

*Primary Examiner* — Bradley T King

(57) ABSTRACT

A brake system for a motor vehicle comprises a normally closed circuit separation valve such that the system is configured to operate in 1) in a by-wire mode when the circuit separation valve is open, such that pressure only from a pressure chamber of a linear actuator is delivered to both first and second pairs of wheel brakes, and 2) in a circuit separation mode with the circuit separation valve in the normally closed position, such that pressure from a tandem master cylinder is delivered only to the first pair of wheel brakes, and such that pressure from the pressure chamber of the linear actuator is concurrently delivered only to the second pair of wheel brakes. The system can provide braking pressure even in the event of a by-wire braking module leak that causes inoperability of an ECU.

14 Claims, 9 Drawing Sheets

(56) References Cited

U.S. PATENT DOCUMENTS

| | | | |
|---|---|---|---|
| 2011/0175436 A1* | 7/2011 | Nakata | B60T 8/4081 |
| | | | 303/6.01 |
| 2012/0256477 A1* | 10/2012 | Miyazaki | B60T 13/168 |
| | | | 303/6.01 |
| 2015/0314767 A1* | 11/2015 | Miyazaki | B60T 13/662 |
| | | | 303/10 |
| 2017/0015290 A1* | 1/2017 | Oosawa | B60T 13/146 |
| 2019/0031165 A1* | 1/2019 | Besier | B60T 8/92 |
| 2019/0184958 A1* | 6/2019 | Watanabe | B60T 13/686 |
| 2019/0344769 A1* | 11/2019 | Zimmermann | B60T 8/326 |
| 2020/0276963 A1* | 9/2020 | Zimmermann | B60T 13/686 |
| 2020/0290586 A1* | 9/2020 | Biller | B60T 13/662 |
| 2020/0307536 A1* | 10/2020 | Biller | B60T 13/686 |
| 2020/0307538 A1* | 10/2020 | Ganzel | B60T 8/4081 |
| 2021/0053540 A1* | 2/2021 | Besier | B60T 8/326 |
| 2021/0339726 A1* | 11/2021 | Kim | B60T 8/171 |
| 2022/0055582 A1* | 2/2022 | Takimoto | B60T 17/22 |

\* cited by examiner

BY-WIRE BRAKE SYSTEM FOR MOTOR VEHICLES

FIELD

This invention relates to electronic braking systems and, more particularly, to a by-wire electronic braking system that provides circuit separation and also employs a tandem master cylinder to provide braking pressure when a leak occurs in a circuit of the system that causes inoperability of the ECU that controls the system.

BACKGROUND

The braking system disclosed in U.S. Pat. No. 9,145,121, includes two master cylinder circuits and one circuit can be effective when there is a leak in the other circuit. However, the system requires a complicated leak monitoring/management to locate the leak location in case there is a leak in the whole brake system to determine the proper degraded operation mode. If the leak location is not determined conclusively, the system goes to a mechanical fallback operation by switching off the motor-powered pressure provider, and this will require a higher pedal effort (higher force and longer stroke) for the driver.

The system disclosed in WO2018130393A1, the contents of which are hereby incorporated by reference herein, can split the brake circuit to one that is connected to the master cylinder and another that is connected to the motor-powered pressure provider in case of a leak. The circuit separation can be obtained via controlling a normally open circuit separation valve without necessarily determining the leak location in the brake system. Thus, the layout allows staying with a by-wire operation (for one circuit) longer and can provide more comfortable braking (lower force and shorter stroke) in the time period compare to hydraulic braking system noted above. However, the system disclosed in WO2018130393A1 has only one master cylinder circuit and, if a circuit of the system leaks, the leak can damage the ECU, and the system may not generate enough pressure (since without activating the normally open circuit separation valve, the system has just one hydraulic circuit that is leaky).

Thus, there is a need to provide a by-wire electronic braking system that provides circuit separation and also employs a tandem master cylinder that provides braking pressure when a leak occurs in a circuit of the system that causes inoperability of the ECU.

SUMMARY

An object of an embodiment is to fulfill the need referred to above. In accordance with the principles of an embodiment, this objective is obtained by providing a brake system for a motor vehicle including first, second, third, and fourth hydraulically operable wheel brakes, the first and second wheel brakes being a first pair of wheel brakes and being configured for braking respective first left side and first right side wheels of the vehicle, and the third and fourth wheel brakes being a second pair of wheel brakes and being configured for braking respective second left side and second right side wheels of the vehicle. A normally open, electrically actuated inlet valve is associated with each of the wheel brakes to control brake pressure at each of the wheel brakes. A tandem master cylinder has first and second pressure chambers. A manually actuated brake pedal is configured to operate the tandem master cylinder. A brake supply line is hydraulically connected with each of the first and second pressure chambers via respective first and second, normally open and electrically operated separation valves, the brake supply line being hydraulically connected with each of the inlet valves. An electrically controllable linear actuator has a pressure chamber hydraulically connected to the brake supply line via a normally closed, electrically operated connection valve. A reservoir contains a pressure medium for supplying the first and second pressure chambers of the tandem master cylinder and the pressure chamber of the linear actuator. A normally closed, electrically operated circuit separation valve is provided in the brake supply line separating, in the normally closed condition thereof, the brake supply line into a first line section hydraulically communicating the second pressure chamber of the tandem master cylinder with only the inlet valves associated with the front wheel brakes, and a second line section hydraulically communicating the pressure chamber of linear actuator with only the inlet valves associated with the second pair of wheel brakes.

At least one electronic control unit (ECU) is electrically connected with at least the linear actuator, inlet valves, the separation valves, connection valve and circuit separation valve such the brake system can operate in 1) a by-wire mode when the ECU actuates the linear actuator; actuates both of the separation valves to close; actuates the connection valve and circuit separation valve to open, such that pressure only from the pressure chamber of the linear actuator is delivered through both the first and second line sections to each of the inlet valves and thus to both the first and second pairs of wheel brakes, and 2) a circuit separation mode with the circuit separation valve in the normally closed position, when the ECU actuates the linear actuator; actuates the first separation valve to close; actuates the connection valve to open such that pressure from the second pressure chamber of the tandem master cylinder, caused by actuation of the brake pedal, is delivered only through the first line section to the inlet valves associated with the first pair of wheel brakes, and such that pressure from the pressure chamber of the linear actuator is concurrently delivered only through the second line section to the inlet valves associated with second pair of wheel brakes.

When the linear actuator is inoperable due to an inoperable ECU caused by a non-catastrophic hydraulic leak in the first circuit, the brake system is configured, upon actuation of the brake pedal, to cause pressure from the first pressure chamber of the tandem master cylinder to be delivered through the second line section to the inlet valves associated with the second pair of wheel brakes, and when the linear actuator is inoperable due to an inoperable ECU caused by a non-catastrophic hydraulic leak in the second circuit, the brake system is configured, upon actuation of the brake pedal, to cause pressure from the second pressure chamber of the tandem master cylinder to be delivered through the first line section to the inlet valves associated with the first pair of wheel brakes.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
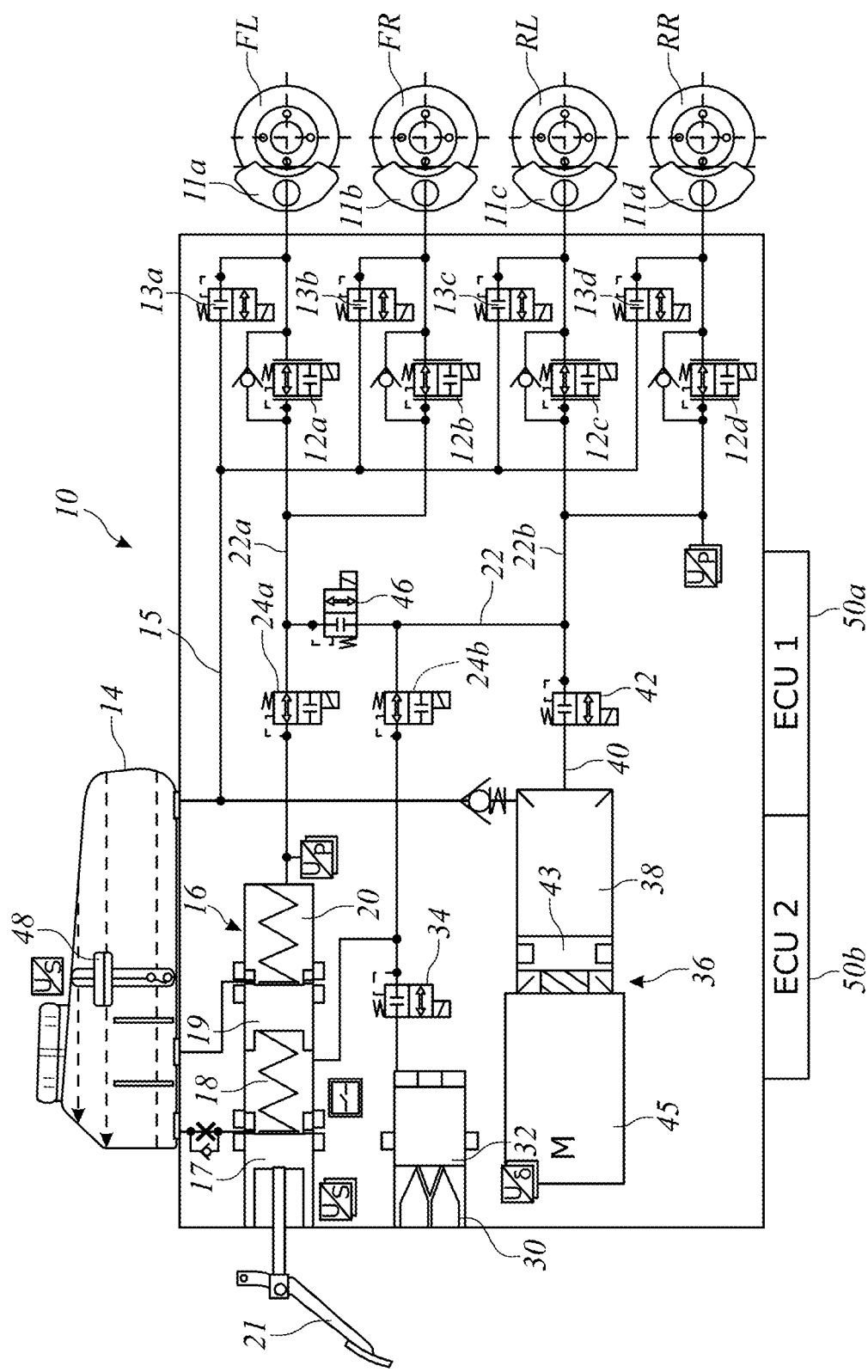
FIG. 1 is a schematic illustration of a brake system in accordance with an embodiment, shown in a rest condition.

With reference to FIG. 1, the embodiment relates to a brake system, generally indicated at 10, for a motor vehicle having at least four hydraulically actuatable wheel brakes 11a-11d for wheels FL, FR, RL, RR, which are distributed among a first vehicle axle and a second vehicle axle (both not shown). An electrically actuated, normally open (when off), inlet valve 12a-12d and an electrically actuated, normally closed (when off), outlet valve 13a-13d is provided for each respective wheel brake 11a-11d. The inlet valves 12a-12d are each connected in parallel with a non-return valve that opens towards the brake supply line 22. The output connections of the outlet valves 13a-13d are connected to a pressure medium (e.g., hydraulic fluid) reservoir 14 via a common return line 15. Although wheel brakes 11a, 11b are shown associated with the front wheels and wheel brakes 11c, 11d are shown associated with the rear wheels, it is noted that front and rear connections can be reversed depending on the vehicle weight distribution between the front and rear of the vehicle and the brake layout. For example, wheel brakes 11a, 11b can be for the rear wheels of the vehicle, while wheel brakes 11c, 11d can be used for the front wheels of the vehicle. Thus, herein, the wheel brakes 11a, 11b can be considered as a first pair of wheel brakes and wheel brakes 11c, 11d can be considered as a second pair of wheel brakes.

A tandem master brake cylinder, generally indicated at 16, includes a first piston 17 and associated first pressure chamber 18 and an adjacent second piston 19 and associated second pressure chamber 20. Pressure chambers 18 and 20 are isolated from each other. The master cylinder 16 can be actuated by means of a brake pedal 21 and which is separably hydraulically connected to a brake supply line 22 by means of electronically actuated, normally open, separation valves 24a, 24b. Thus, a first separation valve 24b is associated with first pressure chamber 18 and a second separation valve 24a is associated with second pressure chamber 20. The inlet valves 12a-12d and outlet valves 13a, 13b are thus connected to connected to the supply line 22.

A simulation device, generally indicated at 26, has a simulator chamber 28, a simulator rear chamber 30 and a simulator piston 32 separating the two chambers 28, 30 from one another. According to the example, the simulation device 26 is designed hydraulically and is hydraulically coupled to the master brake cylinder 16. According to the example, the hydraulic simulator chamber 28 is connected to first cylinder through an electrically actuated simulator release valve 34.

An electrically controllable linear actuator, generally indicated at 36, has a pressure chamber 38 that is hydraulically connected to the brake supply line 22 via feed line 40 and an electrically actuatable, preferably normally closed, connection valve 42 disposed in the feed line 40. The hydraulic connection between the pressure chamber 38 of the electrically controllable linear actuator 36 and the brake supply line 22 (and thus the input connections of the inlet valves 12a-12d) can be opened and shut off in a controlled manner by the connecting valve 42. The pressure medium reservoir 14, under atmospheric pressure, supplies hydraulic fluid to pressure chambers 18, 20 and 38.

The electrically controllable linear actuator 36 is configured as a hydraulic cylinder-piston arrangement (or a single-circuit electro-hydraulic actuator). The piston 43 hydraulic cylinder-piston arrangement can be actuated by an electric motor 45.

Figure 2:
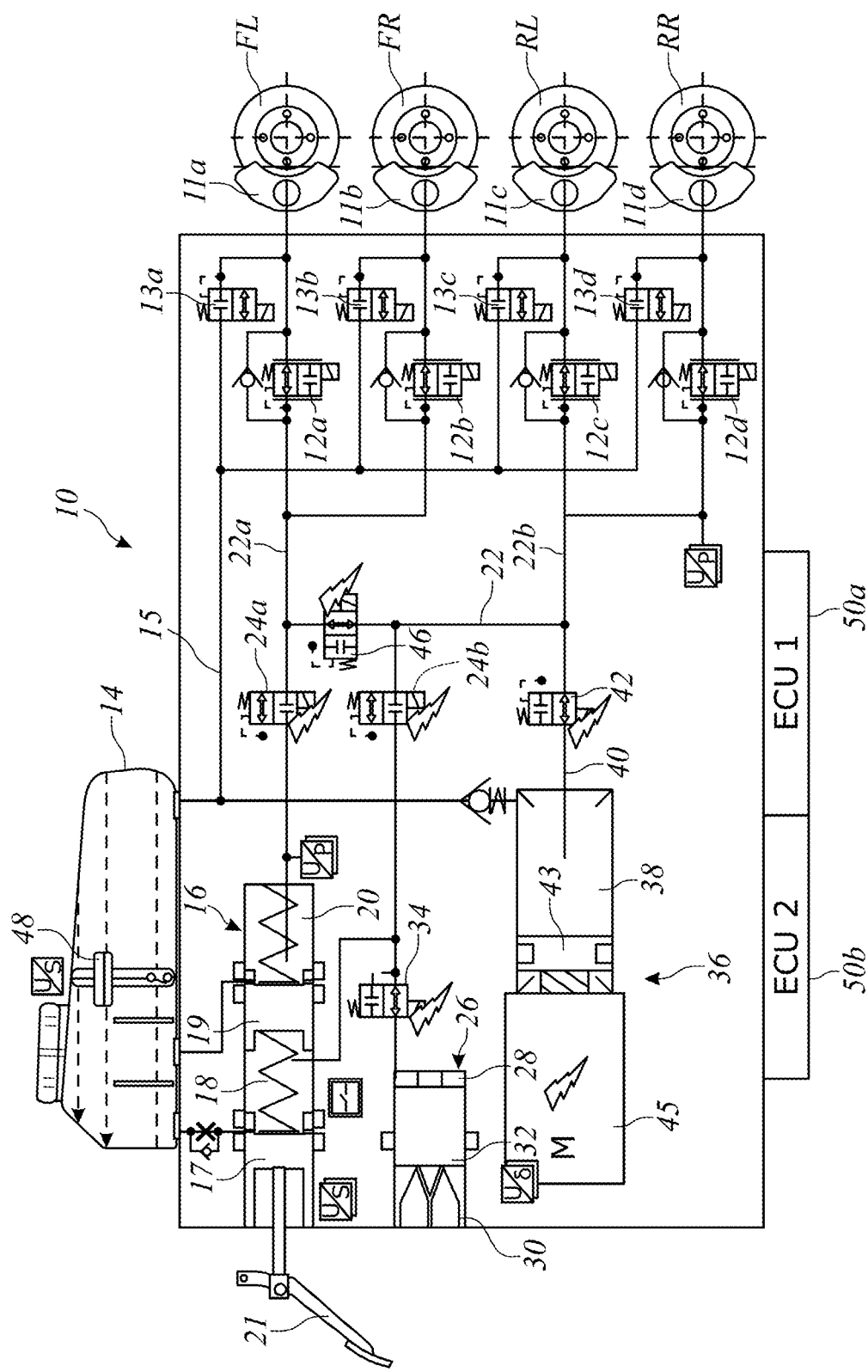
FIG. 2 shows the brake system of FIG. 1 in a normal brake-by wire operation.

In accordance with the embodiment, an electrically actuated, normally closed (when off), circuit separation valve 46 is arranged in the brake supply line 22. As shown in FIG. 2, in by-wire normal operation, the circuit separation valve 46 is switched on by being actuated by the one of the electronic control units (ECU 50a or ECU 50b, preferably ECU 50a). It is noted that an actuated valve is indicated in the drawings with a lightning bolt symbol. Also, valves 24a, 24b are switched on (to close) and valve 42 is switched on (to open) to provide hydraulic fluid pressure to each of the wheel brakes 11a-11d via only the linear actuator 36.

Figure 3:
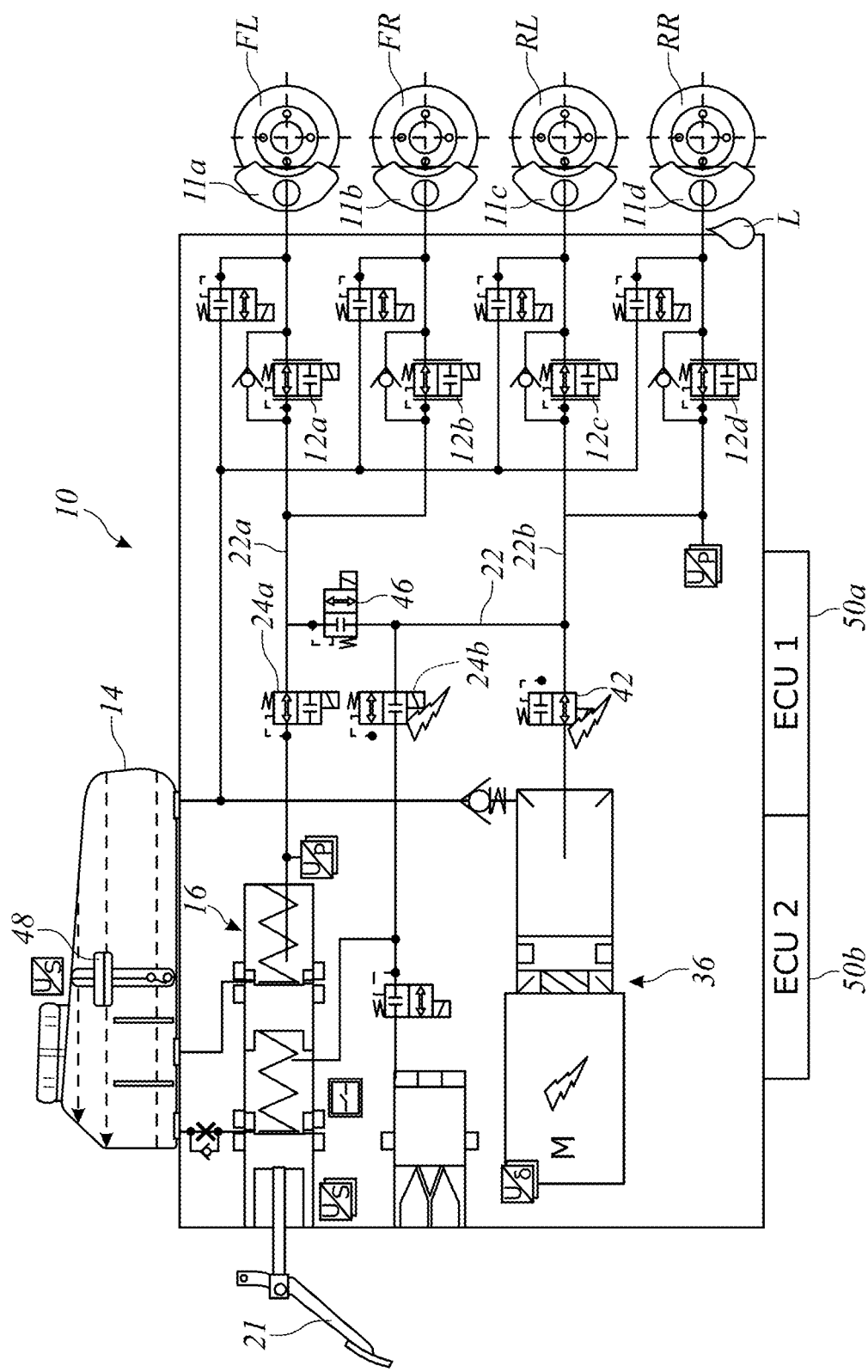
FIG. 3 shows operation of the brake system of FIG. 1 when a leak is in a linear actuator circuit somewhere between a linear actuator and the second pair of wheel brakes.
Figure 4:
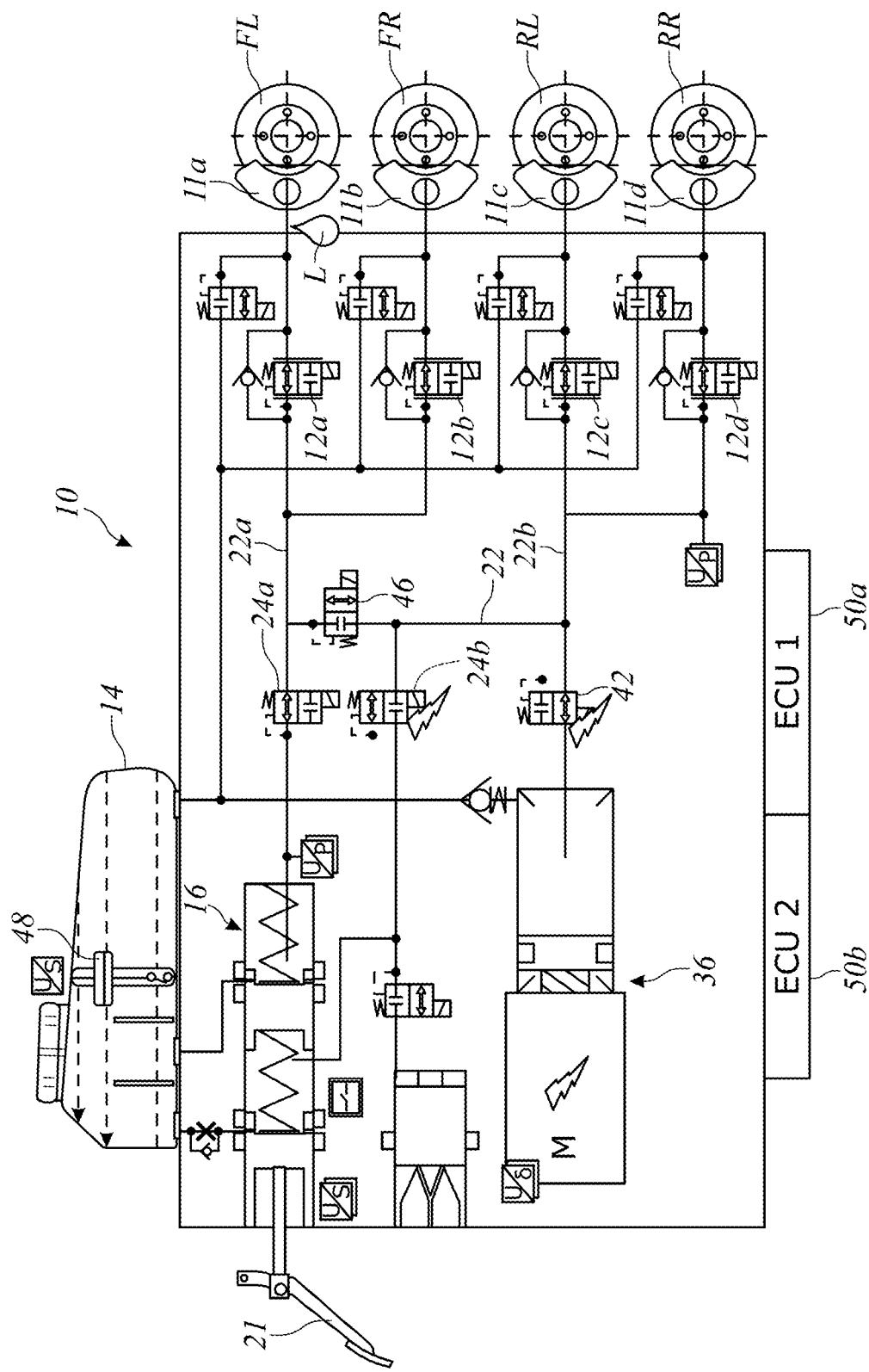
FIG. 4 shows operation of the brake system of FIG. 1 when a leak is in a tandem master cylinder circuit somewhere between a tandem master cylinder and the a first pair of wheel brakes.

With reference to FIG. 3, when an external leak L of hydraulic fluid is detected via sensor 48 in the reservoir 14 by monitoring the level of the hydraulic fluid, or by other leak detection methods, the system 10 may not know where the leak is and does not need to know where it is. For example, FIG. 3 shows a leak in the linear actuator circuit somewhere between the linear actuator 36 and the wheel brakes 11c, 11d, while FIG. 4 shows a leak in the tandem master cylinder circuit somewhere between the tandem master cylinder 16 and the wheel brakes 11a, 11b. Thus, when a leak is detected somewhere in the system 10, one of the ECUs 50a, 50b, preferably ECU 50a will switch off the circuit separation valve 46 (now normally closed). The vehicle driver generates brake pressure to the pedal 21 and thus to the first line section 22a via open valve 24a and to the inlet valves 12a, 12b, actuating wheel brakes 11a and 11b, and the electrically controllable linear actuator 36 concurrently provides brake pressure to the second line section 22b via open connection valve 42 and thus to inlet valves 12c, 12d, actuating wheel brakes 11c and 11d, without leak isolation.

Figure 5:
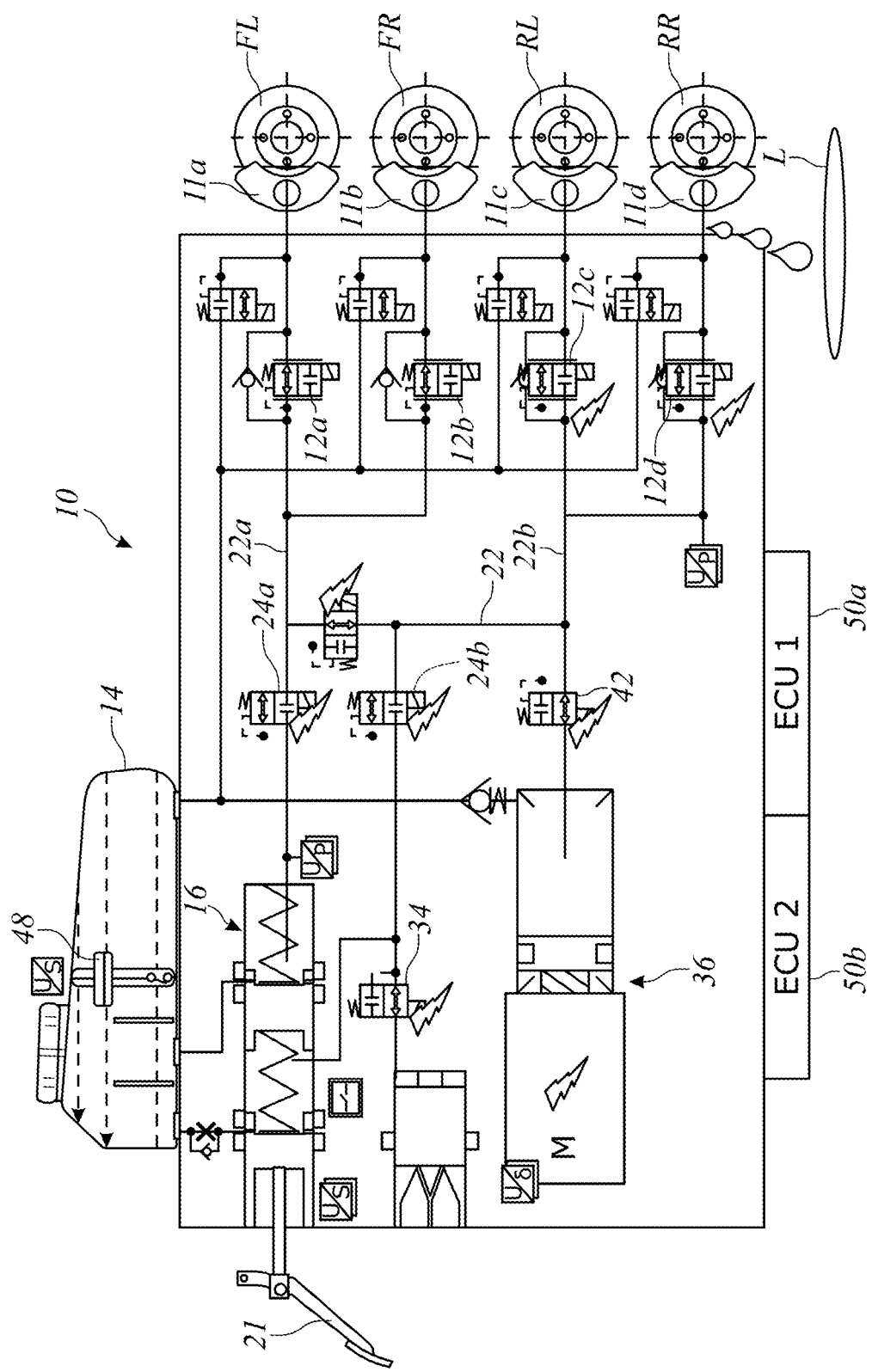
FIG. 5 shows operation of the brake system of FIG. 1 when a leak is identified at the second pair of wheel brakes.

If the location of the leak L can be identified, the system 10 can isolate the leaking part of the circuit while maintaining by-wire braking, via the linear actuator 36, in the non-leaking circuit. For example, with reference to FIG. 5, a leak L has been located in the linear actuator circuit associated with the second pair of wheel brakes 11c, 11d. The ECU 50a actuates (closes) valves 12c, 12c, actuates (opens) the circuit separation valve 46, actuates (closes) the valves 24a, 24b and actuates (opens) valve 42. Thus, brake pressure from the linear actuator 36 passes through valve 42 to supply line 22, through the open circuit separation valve 46 to line section 22a and to the normally open inlet valves 12a, 12b to operate the wheel brakes 11a, 11b.

Figure 6:
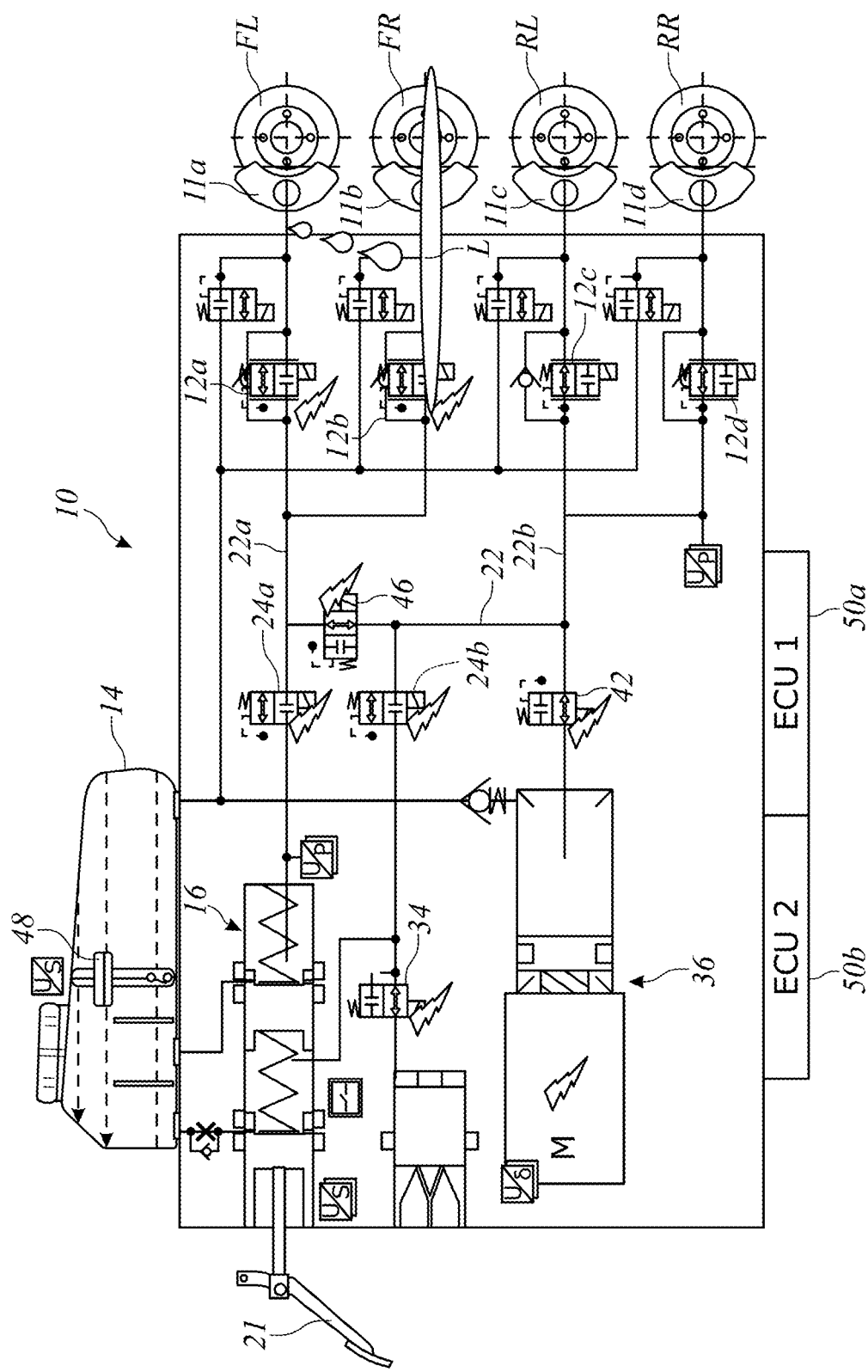
FIG. 6 shows operation of the brake system of FIG. 1 when a leak is identified at the first pair of wheel brakes.

Another example of a known leak location is shown in FIG. 6 with by-wire operation. Thus, a leak L has been located in the tandem master cylinder circuit associated with the wheel brakes 11a, 11b. The ECU 50a actuates (closes) valves 12a, 12b, actuates (opens) the circuit separation valve 46, actuates (closes) the valves 24a, 24b and actuates (opens) connection valve 42. Thus, brake pressure from the linear actuator 36 only passes through connection valve 42 to second supply line section 22b and to the normally open inlet valves 12c, 12d to operate the wheel brakes 11c, 11d.

Figure 7:
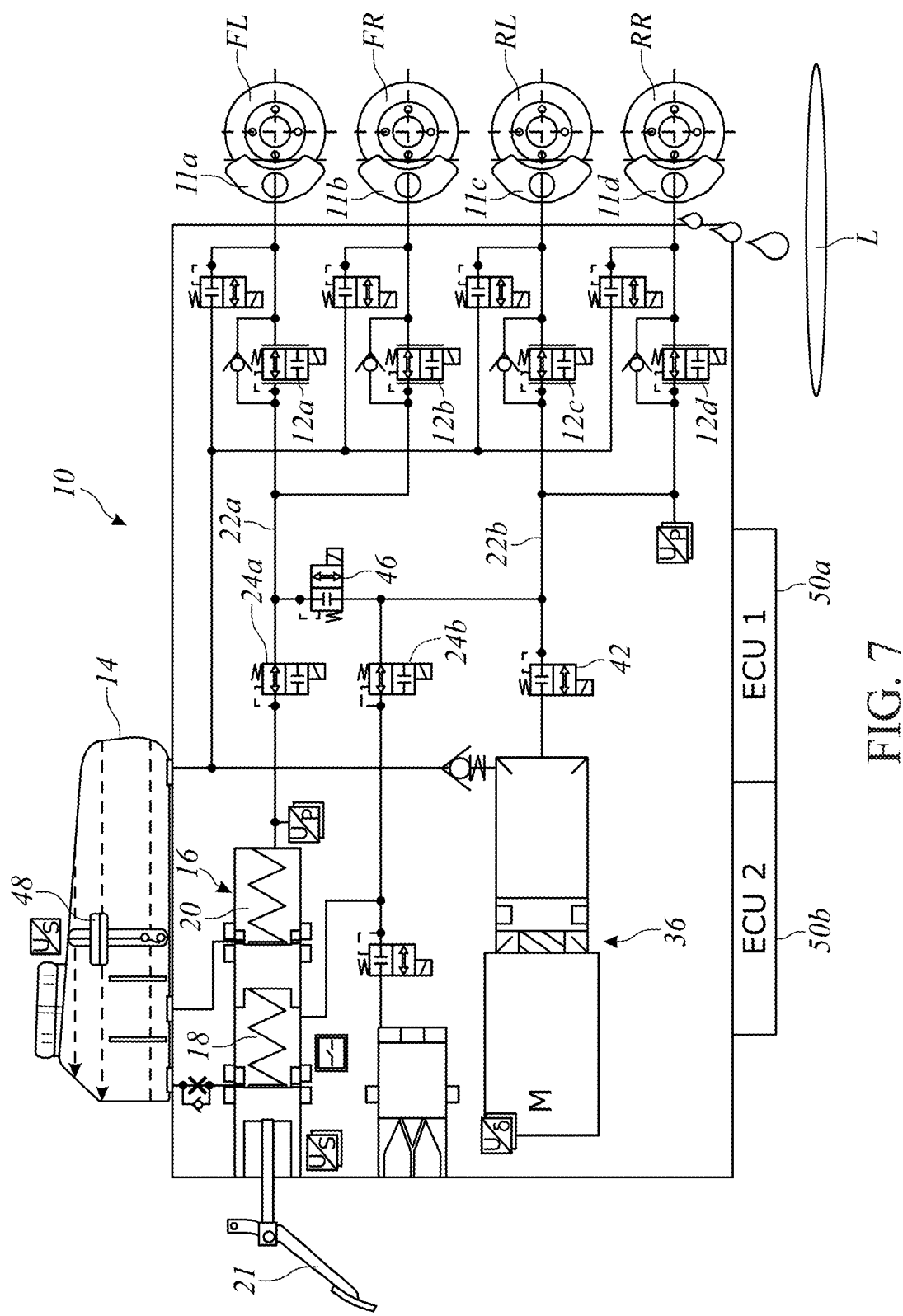
FIG. 7 shows operation of the brake system of FIG. 1 when a leak is in the linear actuator circuit associated with the second pair of wheel brakes and when the linear actuator is incapable of providing proper brake pressure.

If there is a leak L and the linear actuator 36 brake pressure provider is inoperable, one of tandem master cylinder 16 circuits can generate the brake pressure as the driver applies pressure to pedal 21. Thus, with reference to FIG. 7, a leak L is somewhere in the linear actuator circuit associated with the wheel brakes 11c, 11d. When the driver operates the brake pedal 21, pressure from master cylinder pressure chamber 20 passes through the normally open valve 24a in line 22a and to the normally open inlet valves 12a, 12b to operate the wheel brakes 11a, 11b. Since the circuit separation valve 46 is normally closed, no brake pressure from chamber 20 can pass to the inlet valves 12c, 12d where the leak is located.

Figure 8:
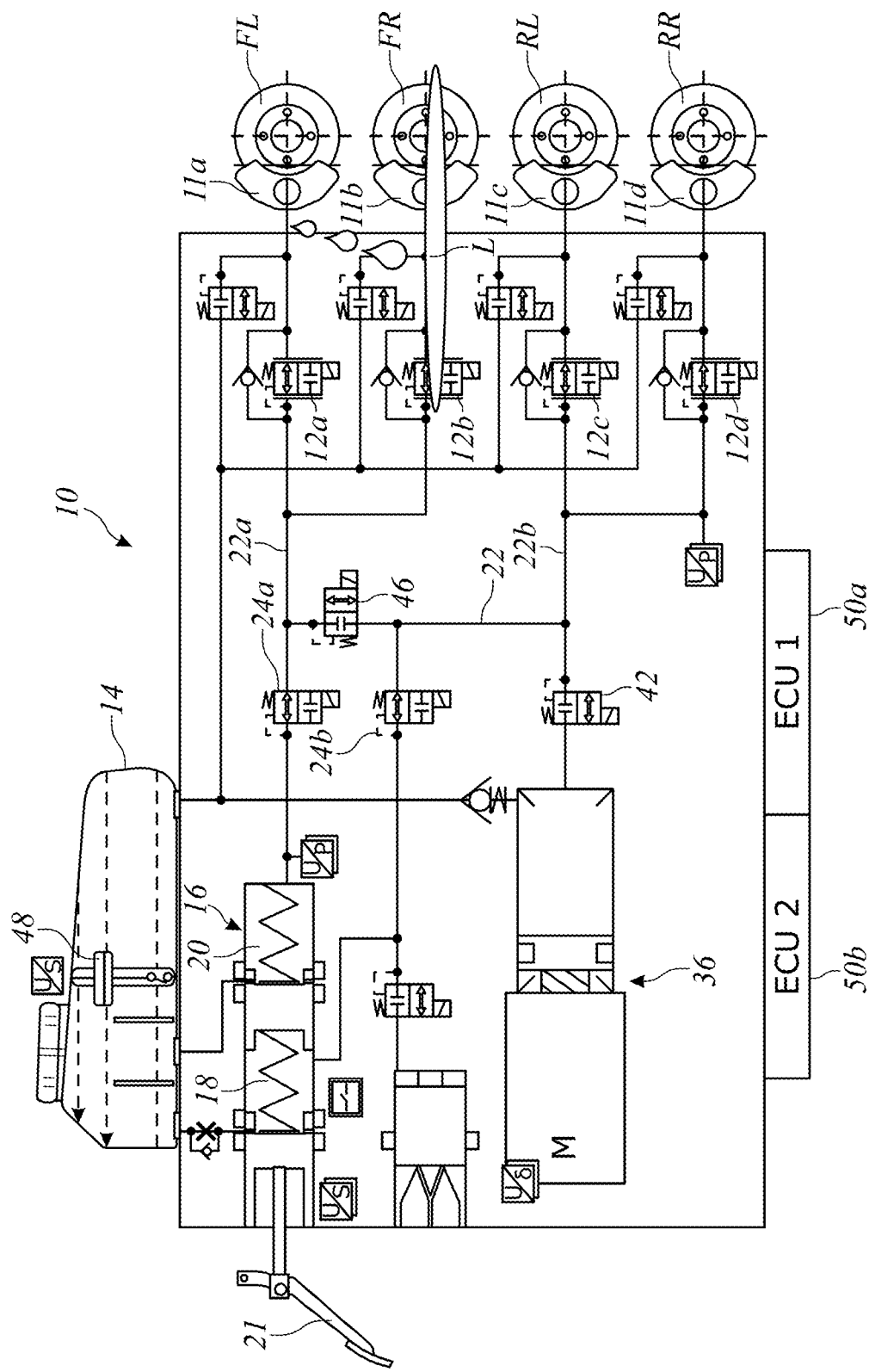
FIG. 8 shows operation of the brake system of FIG. 1 when a leak is in the tandem master cylinder circuit associated with the first pair of wheel brakes and when the linear actuator is incapable of providing proper brake pressure.

FIG. 8 shows operation of the brake system 10 when a leak L is somewhere in the tandem master cylinder circuit associated with the wheel brakes 11a, 11b and when the linear actuator 36 is incapable of providing proper brake pressure. When the driver operates the brake pedal 21, pressure from master cylinder first pressure chamber 18 passes through the normally open first separation valve 24b to the normally open inlet valves 12c, 12d to operate the wheel brakes 11c, 11d. Since the circuit separation valve 46 is normally closed, no brake pressure from chamber 18 can pass to the inlet valves 12a, 12b where the leak is located. The circuit separation valve 46 is configured to hold enough pressure as necessary, for example, at least 100 bar delta pressure from the tandem master cylinder 16.

Figure 9:
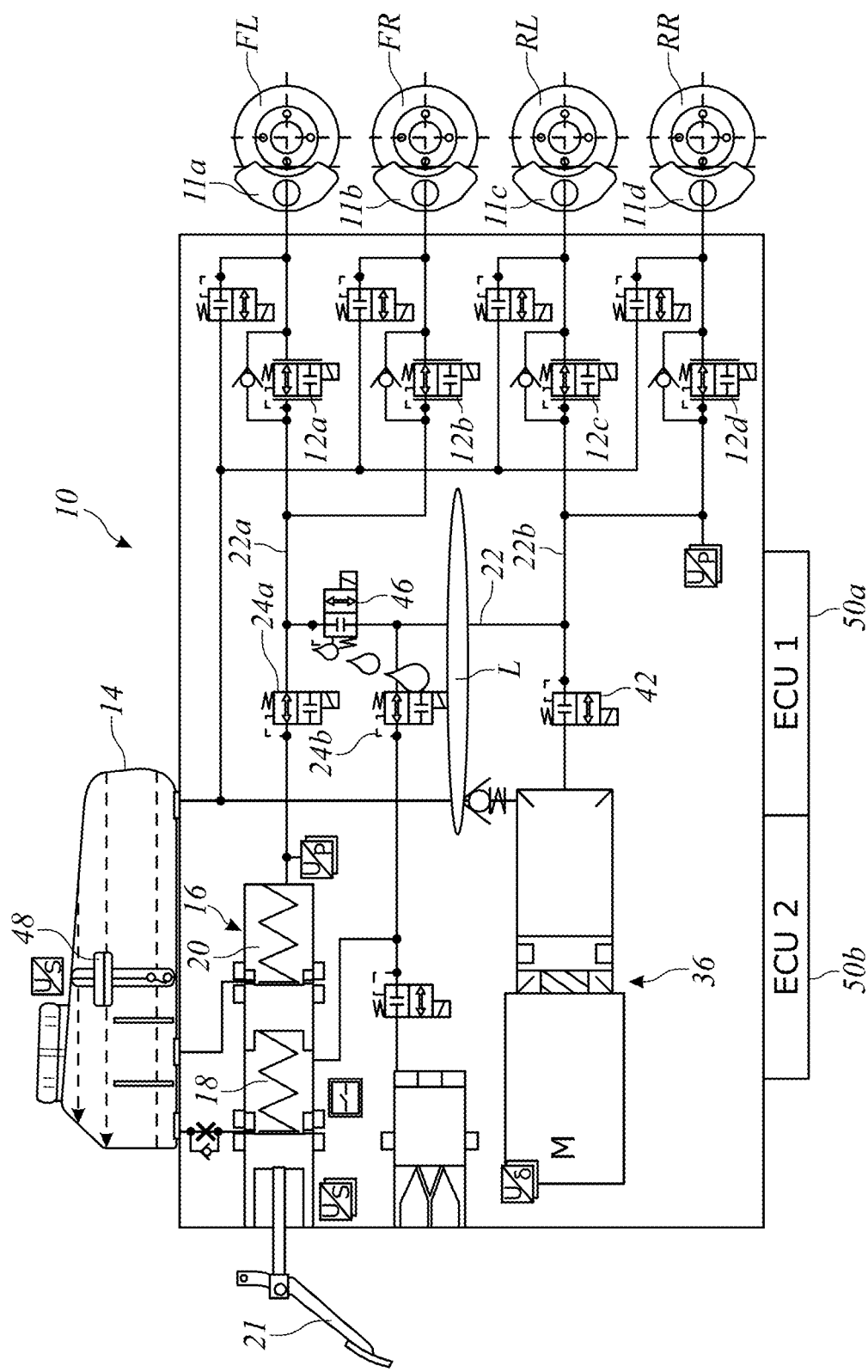
FIG. 9 shows operation of the brake system of FIG. 1 when there is a non-catastrophic leak is a circuit of the system causing inoperability of the ECU.

With reference to FIG. 9, when there is a non-catastrophic leak L in a circuit of the system 10 that possibly causes damage to or inoperability of the at least one ECU (50a or 50b) connected to the system 10 due to the leak, one of the circuits of the tandem master cylinder 16 is still available to generate the brake pressure. In the illustrated embodiment, the non-catastrophic leak L is shown to be at the circuit separation valve 46. This leak can include a sleeve welding leak, a housing caulking leak, or other leak that does not cause a leak to the other side of the valve 46. When the leak L location is in the first circuit including first line section 22a and the ECU (50a or 50b) is damaged, upon actuation of pedal 21, the first chamber 18 of the master cylinder 16 can build pressure at wheel brakes 11c and 11d. When the leak L location is in the second circuit including second line section 22b and the ECU (50a or 50b) is damaged, upon actuation of the pedal 21, the second chamber 20 of the master cylinder 16 can build pressure at wheel brakes 11a and 11b. Thus, the system 10 can still build enough pressure to stop the vehicle when there is a leak and inoperable ECU due to a single cause, unlike the system disclosed in WO2018130393A1.

It is noted that a catastrophic failure at the circuit separation valve 46 (e.g., sleeve welding burst, a housing burst) that cause complete hydraulic braking loss is in theory possible. However, this failure would be the same as the brake module housing fracture that can cause failure of all wheel brakes 11a-11d and is not addressed herein.

It is noted that all electrically operated valves disclosed herein are preferably solenoid operated valves.

The operations and algorithms described herein can be implemented as executable code within the ECUs 50a, 50b having respective processor circuits, or stored on a stand-alone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a micro-processor circuit (not shown) and implemented using one or more integrated circuits, where execution of executable code stored in an internal memory circuit causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. A memory circuit can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A brake system for a motor vehicle, comprising:
first, second, third, and fourth hydraulically operable wheel brakes, the first and second wheel brakes being a first pair of wheel brakes and being configured for braking respective first left side and first right side wheels of the vehicle, and the third and fourth wheel brakes being a second pair of wheel brakes and being configured for braking respective second left side and second right side wheels of the vehicle,
a normally open, electrically actuated inlet valve associated with each of the wheel brakes to control brake pressure at each of the wheel brakes, a tandem master cylinder having first and second pressure chambers, a manually actuated brake pedal configured to operate the tandem master cylinder, a brake supply line hydraulically connected with each of the first and second pressure chambers via respective first and second, normally open and electrically operated separation valves, the brake supply line being hydraulically connected with each of the inlet valves, an electrically controllable linear actuator having a pressure chamber hydraulically connected to the brake supply line via a normally closed, electrically operated connection valve, a reservoir containing a pressure medium for supplying the first and second pressure chambers of the tandem master cylinder and the pressure chamber of the linear actuator, a normally closed, electrically operated circuit separation valve in the brake supply line separating, in the normally closed condition thereof, the brake supply line into a first circuit including a first line section hydraulically communicating the second pressure chamber of the tandem master cylinder with only the inlet valves associated with the first pair of wheel brakes, and a second circuit including a second line section hydraulically communicating the pressure chamber of linear actuator with only the inlet valves associated with the second pair of wheel brakes, and at least one electronic control unit (ECU) electrically connected with at least the linear actuator, the inlet valves, the separation valves, the connection valve and the circuit separation valve such the brake system is capable to operate in 1) a by-wire mode when the at least one ECU actuates the linear actuator, actuates both of the separation valves to close, actuates the connection valve and circuit separation valve to open, such that pressure only from the pressure chamber of the linear actuator is delivered through both the first and second line sections to each of the inlet valves and thus to both the first and second pairs of wheel brakes, and 2) a circuit separation mode with the circuit separation valve in the normally closed position, when the at least one ECU actuates the linear actuator, actuates the first separation valve to close, actuates the connection valve to open such that pressure from the second pressure chamber of the tandem master cylinder, caused by actuation of the brake pedal, is delivered only through the first line section to the inlet valves associated with the first pair of wheel brakes, and such that pressure from the pressure chamber of the linear actuator is concurrently delivered only through the second line section to the inlet valves associated with the second pair of wheel brakes, wherein, when the linear actuator is inoperable due to an inoperable ECU of the at least one ECU caused by a non-catastrophic hydraulic leak in the first circuit, the brake system is configured, upon actuation of the brake pedal, to cause pressure from the first pressure chamber of the tandem master cylinder to be delivered through the second line section to the inlet valves associated with the second pair of wheel brakes, and when the linear actuator is inoperable due to the inoperable ECU caused by a non-catastrophic hydraulic leak in the second circuit, the brake system is configured, upon actuation of the brake pedal, to cause pressure from the second pressure chamber of the tandem master cylinder to be delivered through the first line section to the inlet valves associated with the first pair of wheel brakes.

2. The brake system of claim 1, wherein each of the separation valves, the connection valve, the circuit separation valve and the inlet valves is a solenoid operated valve.

3. The brake system of claim 1, further comprising a leak detection sensor in the reservoir configured for monitoring a level of the pressure medium in the reservoir.

4. The brake system of claim 3, wherein when a leak is detected and a location of the leak is known to be at the second pair of wheel brakes, the at least one ECU is configured to cause the brake system to operate in a by-wire mode by actuating the linear actuator; actuating both of the separation valves to close; actuating the connection valve and circuit separation valve to open; actuating third and fourth inlet valves of the inlet valves to close such that pressure only from the pressure chamber of the linear actuator is delivered to the supply line, thorough the circuit separation valve, to the first line section and to first and second inlet valves of the inlet valves and thus to operate the first pair of wheel brakes.

5. The brake system of claim 3, wherein when a leak is detected by the sensor and a location of the leak is known to be at the first pair of wheel brakes, the at least one ECU is configured to cause the brake system to operate in a by-wire mode by actuating the linear actuator; actuating both of the separation valves to close; actuating the connection valve and circuit separation valve to open; actuating first and second inlet valves of the inlet valves to close such that pressure only from the pressure chamber of the linear actuator is delivered to the second line section and to third and fourth inlet valves of the inlet valves to operate the second pair of wheel brakes.

6. The brake system of claim 1, wherein when the linear actuator is inoperable and when a leak is in the second circuit, the system is configured such that when the brake pedal is actuated, pressure from the second pressure chamber of the tandem master cylinder passes only through the normally open second separation valve and to normally open first and second inlet valves of the inlet valves to operate the first pair of wheel brakes and, due to the normally closed circuit separation valve, no pressure from the second pressure chamber can pass to third or fourth inlet valves of the inlet valves associated with the second pair of wheel brakes.

7. The brake system of claim 1, wherein when the linear actuator is inoperable and when a leak is in the first circuit, the system is configured such that when the brake pedal is actuated, pressure from the first pressure chamber of the tandem master cylinder passes only through the normally open first separation valve to the supply line, to the second line section and to normally open third and fourth inlet valves of the inlet valves to operate the second pair of wheel brakes and, due to the normally closed circuit separation valve, no pressure from the first pressure chamber can pass to the first or second inlet valves associated with the first pair of wheel brakes.

8. The brake system of claim 7, wherein the circuit separation valve is configured to hold at least 100 bar delta pressure.

9. A method of controlling a brake system comprising first, second, third, and fourth hydraulically operable wheel brakes, the first and second wheel brakes being a first pair of wheel brakes and being configured for braking respective first left side and first right side wheels of the vehicle, and the third and fourth wheel brakes being a second pair of wheel brakes and being configured for braking respective second left side and second right side wheels of the vehicle;

a normally open, electrically actuated inlet valve associated with each of the wheel brakes to control brake pressure at each of the wheel brakes; a tandem master cylinder having first and second pressure chambers; a manually actuated brake pedal configured to operate the tandem master cylinder; a brake supply line hydraulically connected with each of the first and second pressure chambers via respective first and second, normally open and electrically operated separation valves, the brake supply line being hydraulically connected with each of the inlet valves; an electrically controllable linear actuator having a pressure chamber hydraulically connected to the brake supply line via a normally closed, electrically operated connection valve; a reservoir containing a pressure medium for supplying the first and second pressure chambers of the tandem master cylinder and the pressure chamber of the linear actuator; a normally closed, electrically operated circuit separation valve in the brake supply line separating, in the normally closed condition thereof, the brake supply line into a first circuit including a first line section hydraulically communicating the second pressure chamber of the tandem master cylinder with only the inlet valves associated with the first pair of wheel brakes, and a second circuit including a line section hydraulically communicating the pressure chamber of linear actuator with only the inlet valves associated with the second pair of wheel brakes; and at least one electronic control unit (ECU) electrically connected with at least the linear actuator, the inlet valves, the separation valves, the connection valve and the circuit separation valve, the method comprising the steps of:

operating the system in a by-wire mode by causing the at least one ECU to actuate the linear actuator, actuate both of the separation valves to close; actuate the connection valve and circuit separation valve to open, such that pressure only from the pressure chamber of the linear actuator is delivered through both the first and second line sections to each of the inlet valves and thus to both the first and second pairs of wheel brakes, operating the system in a circuit separation mode with the circuit separation valve in the normally closed position by causing the at least one ECU to actuate the linear actuator, actuate the first separation valve to close, actuate the connection valve to open such that pressure from the second pressure chamber of the tandem master cylinder, caused by actuation of the brake pedal, is delivered only through the first line section to the inlet valves associated with the first pair of wheel brakes, and such that pressure from the pressure chamber of the linear actuator is concurrently delivered only through the second line section to the inlet valves associated with second pair of wheel brakes, and when the linear actuator is inoperable due to an inoperable ECU of the at least one ECU caused by a non-catastrophic hydraulic leak in the first circuit, upon actuation of the brake pedal, permitting pressure from the first pressure chamber of the tandem master cylinder to be delivered through the second line section to the inlet valves associated with the second pair of wheel brakes, and when the linear actuator is inoperable due to the inoperable ECU caused by a non-catastrophic hydraulic leak in the second circuit, upon actuation of the brake pedal, permitting pressure from the second pressure chamber of the tandem master cylinder to be delivered through the first line section to the inlet valves associated with the first pair of wheel brakes.

10. The method of claim 9, further comprising:
detecting a leak at the second pair of wheel brakes, and
causing the ECU to operate the system in a by-wire mode by actuating the linear actuator, actuating both of the separation valves to close, actuating the connection valve and circuit separation valve to open, actuating third and fourth inlet valves of the inlet valves to close such that pressure only from the pressure chamber of the linear actuator is delivered to the supply line, thorough the circuit separation valve, to the first line section to first and second inlet valves of the inlet valves and thus to operate the first pair of wheel brakes.

11. The method of claim 9, further comprising:
detecting a leak at the first pair of wheel brakes, and
causing the ECU to operate the system in a by-wire mode by actuating the linear actuator, actuating both of the separation valves to close, actuating the connection valve and circuit separation valve to open, actuating first and second inlet valves of the inlet valves to close such that pressure only from the pressure chamber of the linear actuator is delivered to the second line section to third and fourth inlet valves of the inlet valves to operate the second pair of wheel brakes.

12. The method of claim 9, further comprising:
detecting a leak in the second circuit, and
when the linear actuator is inoperable and when the brake pedal is actuated, permitting pressure from the second pressure chamber of the tandem master cylinder to pass only through the normally open second separation valve and to normally open first and second inlet valves of the inlet valves to operate the first pair of wheel brakes and, with the normally closed circuit separation valve, ensuring that no pressure from the second pressure chamber can pass to third or fourth inlet valves of the inlet valves associated with the second pair of wheel brakes.

13. The method of claim 9, further comprising:
detecting a leak in the first circuit, and
when the linear actuator is inoperable and when the brake pedal is actuated, permitting pressure from the first pressure chamber of the tandem master cylinder to pass only through normally open first separation valve of the inlet valves to the supply line, to the second line section and to the normally open third and fourth inlet valves to operate the second pair of wheel brakes and, with the normally closed circuit separation valve, ensuring that no pressure from the first pressure chamber can pass to the first or second inlet valves associated with the first pair of wheel brakes.

14. The method of claim 13, further comprising:
configuring the circuit separation valve to hold at least 100 bar delta pressure.

* * * * *